US011240146B2

(12) United States Patent
Farnham

(10) Patent No.: US 11,240,146 B2
(45) Date of Patent: Feb. 1, 2022

(54) SERVICE REQUEST ROUTING

(71) Applicant: Kabushiki Kaisha Toshiba, Minato-ku (JP)

(72) Inventor: Timothy David Farnham, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/668,996

(22) Filed: Oct. 30, 2019

(65) Prior Publication Data

US 2021/0135983 A1    May 6, 2021

(51) Int. Cl.
| | |
|---|---|
| *G06F 15/16* | (2006.01) |
| *H04L 12/725* | (2013.01) |
| *H04L 29/08* | (2006.01) |
| *H04L 12/26* | (2006.01) |
| *H04L 12/721* | (2013.01) |
| *H04L 29/06* | (2006.01) |
| *H04W 84/18* | (2009.01) |

(52) U.S. Cl.
CPC ........ *H04L 45/302* (2013.01); *H04L 43/0852* (2013.01); *H04L 43/0882* (2013.01); *H04L 45/306* (2013.01); *H04L 45/70* (2013.01); *H04L 63/0807* (2013.01); *H04L 63/10* (2013.01); *H04L 67/16* (2013.01); *H04L 67/2814* (2013.01); *H04L 67/322* (2013.01); *H04L 67/327* (2013.01); *H04W 84/18* (2013.01)

(58) Field of Classification Search
CPC ..... H04L 45/08; H04L 41/147; H04L 45/302; H04L 67/16; H04L 45/70; H04L 45/306
USPC ........................................................ 709/245
See application file for complete search history.

(56) References Cited

U.S. PATENT DOCUMENTS

| | | | |
|---|---|---|---|
| 7,203,489 B2 | 4/2007 | Saunders | |
| 7,626,969 B2 | 12/2009 | Hart et al. | |
| 10,182,129 B1 * | 1/2019 | Peterson | ............. H04L 41/5009 |
| 10,362,099 B2 * | 7/2019 | Pai | ....................... H04L 67/1008 |
| 2006/0217944 A1 | 9/2006 | Hunt et al. | |

(Continued)

FOREIGN PATENT DOCUMENTS

| | | |
|---|---|---|
| GB | 2507492 A | 5/2014 |
| WO | WO 2010/015286 A1 | 2/2010 |
| WO | WO 2010/116688 A1 | 10/2010 |

OTHER PUBLICATIONS

Dharmendra Shadija, et al., "Microservices : Granularity vs. Performance", Companion Proceedings of the 10th International Conference on Utility and Cloud Computing—UCC '17 Companion. ACM Press, 2017 215-220 & cover sheet.

Amit Singh Gaur, et al., "Design and Performance Evaluation of Containerized Microservices on Edge Gateway in Mobile IoT", 2018 IEEE International Conference on Internet of Things, Green Computing and Communications Cyber, Physical and Social Computing, Smart Data, Blockchain, Computer and Information Technology, Congress on Cybermatics, 2017, 8 pages.

(Continued)

*Primary Examiner* — Umar Cheema
*Assistant Examiner* — Tesfu N Mekonen
(74) *Attorney, Agent, or Firm* — Oblon, McClelland, Maier & Neustadt, L.L.P.

(57) ABSTRACT

A computer implemented method of routing service requests to service instances in a service mesh. The method comprises monitoring one or more performance characteristics of each of a plurality of network links to service instances. The method further comprises making a prediction of the network latency of transmitting a service request via each of at least two of the plurality of network links and selecting one of the plurality of service instances and routing the service request thereto based on the predictions of the network latencies.

18 Claims, 7 Drawing Sheets

(56) References Cited

U.S. PATENT DOCUMENTS

| | | | |
|---|---|---|---|
| 2008/0165741 A1 | 7/2008 | Fu et al. | |
| 2014/0086576 A1* | 3/2014 | Campbell | H04J 14/0269 398/28 |
| 2015/0271255 A1* | 9/2015 | Mackay | H04L 67/101 709/226 |
| 2016/0124742 A1 | 5/2016 | Rangasamy et al. | |
| 2016/0380892 A1* | 12/2016 | Mahadevan | H04L 45/02 370/389 |
| 2018/0077080 A1 | 3/2018 | Gazier et al. | |
| 2018/0088935 A1 | 3/2018 | Church et al. | |
| 2018/0331905 A1* | 11/2018 | Toledo | H04L 43/0882 |
| 2019/0036813 A1* | 1/2019 | Shenoy | H04L 45/24 |
| 2020/0136911 A1* | 4/2020 | Assali | H04L 41/5058 |
| 2020/0195528 A1* | 6/2020 | Barton | H04L 47/2475 |
| 2020/0322233 A1* | 10/2020 | Gao | H04L 43/0852 |

OTHER PUBLICATIONS

Yuvraj Sahni, et al., "Edge Mesh: A New Paradigm to Enable Distributed Intelligence in Internet of Things" IEEE Access, vol. 5, 2017, 18 pages.

J.S. Xu, et al., "A Novel Measurement-Based Algorithm for Coverage Prediction of Urban and Suburban Cells in Wireless Networks", IEEE Transactions On Antennas and Propagation, vol. 54, No. 11, Nov. 2006, 6 pages.

Li Xu, et al., "Enhanced Signal-Strength-Difference Position Method Based on an Invasion Propagation Model in Cellular Network", 2008 IEEE 4th International Conference on Wireless Communications, Networking and Mobile Computing, 2008, 4 pages.

* cited by examiner

SERVICE REQUEST ROUTING

FIELD

Embodiments described herein relate to routing service requests, more specifically the embodiments relate to methods, systems, and policies for routing service requests to service instances in a service mesh.

BACKGROUND

Microservices are self-contained software components which may be built and deployed independently to perform specific functions. A single application may comprise or use a plurality of microservices which each separately perform individual functions of the application. Microservices are widely used to define modular cloud-native applications.

In use, copies, or instances, of microservices may be deployed on virtual processing and networking resources, such as within containers (within virtual machines) which are run on hardware resources such as servers. A single application may at any one time consist of a plurality of instances of a plurality of microservices, the microservice instances being deployed on different intercommunicating hardware resources within one or more networks, which in some cases may be a distributed cloud infrastructure. The deployment of microservices is performed by a container orchestration manager such as Kubernetes®.

The plurality of microservices of an application communicate with each other using a service mesh, which is a dedicated infrastructure layer for handling service-to-service communication. Service meshes operate by providing an array of service proxies, each of which is associated with a single microservice, or with a group, or pod, of multiple such microservices. Communications between the microservices are transmitted via the proxies and a communication network defined therebetween.

Service meshes consist of a data plane and a control plane. The data plane comprises the service proxies, the microservices and their communications, all of which are intercepted and transmitted via the service proxies. The control plane distributes policies and monitors the data plane.

Policies are distributed by the control plane to the service proxies of the data plane and control proxy behaviour without directly interacting with the service-to-service communications. Examples of policies include network management or security policies.

Policies distributed by the control plane are implemented by the service proxies and determine how service-to-service traffic is routed within the data plane, thereby allowing dynamic routing of service requests; for example, based on the type of request or to facilitate load balancing between the distributed and networked resources.

In addition to distributing policies to the service proxies, the control plane monitors the data plane and collects performance metrics thereon. Control planes may also perform other functions in service mesh, such as respond to queries from their associated data plane or assigning certificates to microservices.

Examples of widely used service meshes include Istio® and Linkerd®.

Where the microservices of an application are distributed across multiple hardware resources in a network, some or all of the communications between microservices must be transmitted between different hardware resources via the network.

Service meshes have historically been supported by high reliability, low latency networks. However, in some circumstances it may be advantageous to implement service meshes on dynamic networks which may experience changes in network performance. For example, a service mesh may be hosted on networks comprising both cloud resources, which are dynamically scalable in a cost effective manner, and local edge resources communicating via local network connections which may offer higher bandwidth and lower latency performance.

Changes in network performance are common on local wireless networks and wide area network connections will have limited capacities. Service-to-service communications in a service mesh hosted on such hybrid cloud edge networks may therefore experience changes in network performance.

In known cloud based service mesh solutions, performance statistics have been measured and used to determine how service requests should be routed. For example, wherein the control plane of a service mesh monitors the overall latency of service requests to specific microservice instances within the service mesh and implements routing policies to the proxies in response thereto. The overall latency of a service request to a microservice includes both the network or link latency of the communication to the microservice and the processing latency of the microservice itself, which are not distinguished in known monitoring solutions.

Such approaches consider the service mesh to be homogenous and to have high bandwidth network connections. The latency at a particular node of the service mesh has therefore been considered to be independent of the origin of service requests transmitted thereto and requests have only been routed and throttled in response to common shared information, such as historical service request latency statistics. In order to monitor the latency of individual links, it is helpful to know how virtual links between service proxies map onto physical links between the resources on which the microservices associated with the service proxies are hosted, which is not performed in known approaches.

Therefore, this approach has not accounted for variation in the performance of network links between hardware resources on which the microservices of the service mesh are run. Such performance variation occurs if nodes of the hosting are connected by wireless or lower bandwidth connections, which can cause performance bottlenecks.

An aim of the present embodiments described herein is to provide improvements to the routing of service requests in service meshes which account for variable network performance.

Arrangements of the embodiments will be understood and appreciated more fully from the following detailed description, made by way of example only and taken in conjunction with the drawings in which:

FIG. 1 shows the architecture of an example edge mesh network;

FIG. 2*a*) is a flow chart illustrating the invoking and routing of a service request in a prior art service mesh;

FIG. 2*b*) is a flow chart illustrating the invoking and routing of a service request according to an embodiment;

DETAILED DESCRIPTION

Figure 1:
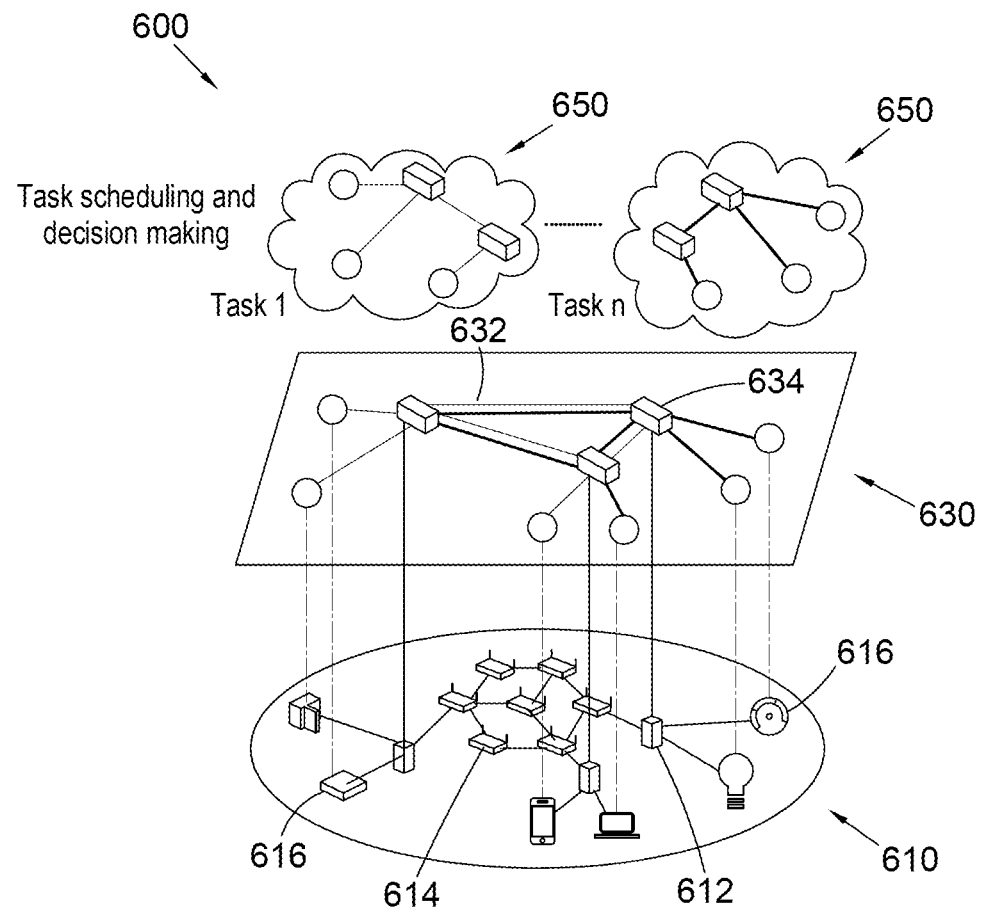

According to an embodiment there is provided a computer implemented method of routing service requests to service instances in a service mesh, the method comprising: monitoring one or more performance characteristics of each of a plurality of network links, each of the network links being to one of a plurality of service instances; making a prediction of the network latency of transmitting a service request via each of at least two of the plurality of network links; and using the predictions of the network latencies to select one of the plurality of service instances and route the service request thereto.

The service request may be routed from and/or by a service proxy, which may be a service proxy associated with a service instance from which the service request originated, or may be a proxy associated with a gateway via which external service requests may be introduced to the service mesh, or may be introduced to a cluster of service instances and associated service proxies, and/or of hosts thereof, which are comprised by the service mesh. Therefore, each of the network links may from a first service proxy and the service request may be routed to the selected service instance from the first service proxy.

The service instances are preferably microservice instances. The service instance may be comprised by an application, such as a microservice architecture application and/or a cloud native application.

Each service instance is preferably associated with a service proxy which may be dedicated to that single service instance or may be associated with a plurality of service instances (which may be instances of the same service or of one or more different services). Each service instance may be deployed within a container and/or virtual machine within which the service proxy associated with the service instance (and any other service instance associated with that service proxy) is preferably also deployed. Each service instance, service proxy, and/or container may be deployed on a host, which may be physical (such as a server or other processing resource) or may be virtual.

The service mesh may comprise a data plane and a control plane. The data plane may comprise a plurality of service proxies, by which the service requests may be routed. One, some or all of the plurality of service proxies may be associated with individual service instances, individual gateways (such as ingress gateways) and/or groups or pods of multiple service instances and/or gateways. The control plane may control the service proxies (for example, by distributing routing policies thereto) and/or may monitor the data plane (for example, by collecting telemetry).

The plurality of network links may each be to a different one of the plurality of service instances. Alternatively, the plurality of service instances may comprise multiple network links to one, some or all of the plurality of service instances. In such embodiments, if a service instance with multiple links thereto is selected, which of the network links thereto is preferably also selected based on the predictions of latencies.

The network links to the plurality of service instances may be direct links to the service instances from the origin of the service request (preferably a first routing service proxy as described above). Alternatively, one, some, or all of the plurality of network links may be via one or more intermediate service proxies (which may be associated with service instances or gateways).

One, some or all of the plurality of the network links may be or may comprise virtual network links of service mesh and/or physical network links between resources on which the service proxies—or the one or more microservice instances or other entities associated therewith—are hosted.

The one or more performance characteristics may comprise the maximum observed capacity of the network link (for example over the course of a period for which the network link is monitored), the proportion of an observed period for which the network link is active; and/or the latency and size (for example, in bytes) of a service request or other communication transmitted via the network link.

One, some or all of the one or more performance characteristics may be monitored continuously or periodically. In embodiments in which a plurality of or performance characteristics are monitored, one or some may be monitored continuously and one or some may be monitored periodically. If a plurality of performance characteristics are monitored periodically, they may be monitored with identical or different frequencies.

In some embodiments, the network links may be monitored by the service proxy by and from which the service request is routed and/or by the service proxy associated with the service instance that the network link is to. Each network link may be monitored by the pair of service proxies at or associated with each end thereof.

Alternatively, or additionally, the network links may be monitored by the control plane and/or by other elements in communication with the control plane and/or one or both of the service proxies at or associated with each end of the network links.

The plurality of network links may be some, most, or all of the network links to service instances of the service mesh from the origin of the service request (preferably a first routing service proxy as described above).

Making a prediction of the network latency of transmitting a service request via each of at least two of the plurality of network links may comprise making predictions of transmitting a service request via each network link to a suitable service instance. Suitable service instances preferably being instance of one or more suitable services (a service to which the service request is intended to be sent). The one or more suitable services for a service request may be identified by an address, Uniform Resource Identifier (URI), or other identifier comprised by or associated with the service request.

The making of the prediction of routing a service request via a network link is preferably performed using the one or more monitored performance characteristics of that network link, parameters derived therefrom, and/or other factors (such as the data size of the service request and/or an expected response thereto).

The selected one of the plurality of service instances is preferably one of the service instances which the at least two network links were to. The at least two network links are preferably to at least two different service instances.

The service instances (and/or the service proxies, gateways and/or other entities associated therewith) may be hosted on hosts, such as resources, which may be interconnected by a plurality of networks. The plurality of networks may comprise one or more Local Area Networks and one or more Wide Area Networks or cloud networks.

The method may comprise deriving and/or estimating one or more parameters of each of the plurality of network links, one some or all of which may be used to make a prediction of the network latency of transmitting a service request via that network link. The parameters may comprise: utilisation and/or availability factors (which be derived from the proportion of an observed period for which the network link is active) and/or effective line capacities (which may be estimated using the maximum observed capacity and the proportion of an observed period for which the network link is active). The estimations or derivations of a parameter of a network link are preferably made using the monitored one or more performance characteristics of that network link. The estimations or derivations may be performed by the control plane of the service mesh and may be used to generate, or may be incorporated into, a routing policy.

For example, the method may comprise estimating an effective capacity for each of the plurality of network links, which may comprise multiplying a maximum observed capacity that network link by a fraction of an observed period for which the network link is not active.

Making a prediction of the network latency of transmitting a service request via a network link may comprise dividing a data size of the service request by the estimated effective capacity of that network link. Alternatively, or additionally, making predictions of the network latency of transmitting a service request via a network link may comprise dividing the sum of the data size of the service request and the data size of an expected response to the service request by the estimated effective capacity of that network link. The data size of the service request and/or of the expected response may be estimated. Such predictions may be performed by the service proxy by and/or from which the service request is routed; for example, when the service proxy evaluates a routing policy.

The method may comprise comprising generating a routing policy for evaluating by service proxies to select a service instance to route a service request to and/or a network link to route the service request via. The routing policy preferably being generated based on and/or using the one or more monitored performance characteristics of the plurality of network links.

The method may comprise using the monitored performance characteristics of the plurality of network links to generate a routing policy for evaluating by a service proxy (preferably a first service proxy as described above) to make a prediction of the network latency of transmitting a service request via each of at least two of the plurality of network links and to select one of the plurality of service instances to route the service request to.

In some embodiments, a routing policy may be generated for multiple service proxies by and/or from which service requests may be routed. In such embodiments, the same routing policy may be generated for, distributed to, and/or evaluated by each of the multiple service proxies. The routing policy may be generated based on and/or using the one or more monitored performance characteristics of a plurality of network links from each of the multiple service proxies to service instances (some or all of which may be or may comprise the same network links as from other proxies). The multiple service proxies the majority of, substantially all of, or all of may be all of the service proxies comprised by the service mesh, or by one or more clusters thereof.

In some embodiments, one or more performance characteristics of all, or substantially all of the network links of a service mesh may be monitored. In such embodiments a routing policy may be generated and/or based therefrom. The routing policy may be for and/or distributed to all, or substantially all, of the service proxies in the service mesh.

The method may comprise monitoring one or more performance characteristics of substantially all of the network links of the service mesh, and using the monitored performance characteristics to generate a routing policy for evaluating by substantially all of the service proxies comprised by the service mesh to make a prediction of the network latency of transmitting a service request therefrom via each of at least two of the plurality of network links to service instances and to select one of the service instances to route the service request to.

The method may further comprise one of the plurality of service proxies evaluating the routing policy to route the service request. The evaluating of the routing policy preferably comprises the making of the prediction of the network latency of transmitting a service request via each of at least two of the plurality of network links and using the predictions of the network latencies to select of one of the plurality of service instances (and optionally one of a plurality of network links thereto). Alternatively, the evaluation of the routing policy may be based on the predictions of the network latencies.

The method may comprise transmitting the service request to the selected service instance. The method may further comprise a response being transmitted from the selected service instance to the origin of the service request, which is preferably a service proxy by and/or from which the service request was routed.

The method may comprise predicting the total latency of making the service request via each of the at least two of the plurality of network links to one of a plurality of service instances. Predicting the total latency may comprise summing the predicted network latencies of transmitting the service request via each of the at least two network links and a processing latency for making the service request to the respective microservice instance that the network link is to. This prediction may be performed by the service proxy by and/or from which the service request is routed, for example, during the evaluation of a routing policy.

The method may further comprise selecting the service instance and/or network link with the lowest predicted total latency of making the service request thereto.

The method may comprise: determining whether the predicted total latency of making a service request via each of the at least two network links to one of the plurality of service instances exceeds a maximum target latency; excluding network links to service instances with predicted total latencies which exceed the maximum target latency; and selecting a service instance with a network link thereto which is not excluded.

In alternative embodiments, a destination service instance (and optionally one of a plurality of network links thereto) may be selected to minimise only the network latency, or after excluding those with network latencies below a target maximum network latency.

The maximum target latency may be dependent upon a role of a requestor of the service request. The role of the requestor may be identified by an access token which may be embedded within the service request.

Which of the service instances with a network link thereto which is not excluded to select may be determined using a randomisation method. This may provide load balancing. The randomisation method may use weightings assigned to each of the service instances with network links thereto which are not excluded. The weightings may be dependent upon the predicted network and/or total latency of making the service request to that service instance and/or via that network link, service instances and/or network links with lower latencies preferably having greater weightings. For example, the weightings may be substantially inversely proportional to the predicted latencies of making the service request to that service instance and/or via that network link.

The method may comprise identifying a role of the requestor of the service request and may comprise selecting one of the plurality of service instances and routing the service request thereto based on the predictions of the network latencies and the role of the requestor.

According to another embodiment, there is provided a service proxy for use in a service mesh, the service proxy configured to: monitor one or more performance characteristics of each of a plurality of network links from the service proxy to communicatively connected service instances, thereby generating monitoring results; predict a network latency of transmitting a service request over each of the plurality of network links; and select one of the communicatively connected service instance and route the service request thereto based on the predictions of the plurality of network latencies.

The service proxy may be further configured to: report said monitoring results to a control plane for directing microservice request routing in the service mesh; receive a prediction of a performance characteristic of each of at least two of the plurality of network links; and use the predictions of the performance characteristics to predict the network latency of transmitting the service request via each of the at least two of the plurality of network links.

The prediction of a performance characteristic of each of the at least two of the plurality of network links may be a prediction of the capacity of that network link. Such a prediction may be derived from monitored capacity and activity of the network link as described above with reference to the method embodiments.

The service proxy may have any of the suitable optional features described above with reference to the method embodiments.

According to another embodiment, there is provided a controller configured to implement a control plane for directing service request routing to service instances in a service mesh, the controller configured to: receive monitoring results individually relating to a network link of a plurality of network links to service instances in the service mesh, an individual monitoring result of the monitoring results indicative of one or more performance characteristics of a said network link; and generate a routing policy for routing a service based on predicting the network latencies of transmitting a service request via each of at least two of the plurality of network links.

The controller may receive the monitoring results from service proxies (such as service proxies of the second aspect of the invention), or from other monitoring systems. Alternatively, or additionally, the controller may monitor the network links itself.

The control plane may have any of the suitable optional features described above with reference to the method embodiments.

According to another embodiment, there is provided a service mesh comprising a plurality of service proxies as described above and a controller implementing a control plane as described above.

According to another embodiment, there are provided one or more non-transitory storage media comprising computer instructions executable by one or more processors, the computer instructions when executed by the one or more processors causing the one or more processors to perform a method as described above.

The one or more non-transitory storage media may be a plurality of non-transitory storage media, which may each comprise computer instructions executable by one or more processors. The computer instructions comprised different non-transitory storage media may be different and/or may be executed by one or more processors at different times. For example, a plurality of non transitory storage media may each comprise one of a plurality of different sets of computer instructions, each of the different sets of computer instruction when executed by one or more processors causing the one or more processors to perform different steps of the method.

Alternatively, the one or more non-transitory storage media may be a single non-transitory storage medium, which may comprise computer instructions for executing every step of the method. For example, in embodiments where a single service proxy performs every step of the method.

The one or more processors may be a plurality of processors.

The one or more non-transitory storage media comprising computer instructions may have any optional feature described above with reference to the method embodiments.

According to another embodiment, there is provided a method of routing a service request, the method comprising: identifying the role of a requestor of a service request; assigning a priority to the service request derived from the role; and routing the service request based on the priority.

The method embodiments described above may advantageously allow the latency of at least part of one or more potential routes through a network to be predicted before a service mesh routes a service request to a microservice of an application at least partially hosted on the network. This may for example, allow latency critical service requests to be routed via low latency links while routing less latency critical requests via routes with higher predicted latencies. This may improve load balancing or conserve bandwidth within the network.

The service mesh may control service-to-service communications between the plurality of microservices which may be hosted on a plurality of networked resources. In some embodiments the service mesh may additionally control communications to the microservices from other sources and/or communications from the microservices to other destinations. Service requests between the microservices may be routed in dependence upon predictions of the latency of transmitting the service requests via one or more network links between microservices of the service mesh. The predictions of the latency of transmitting the service requests via the one or more network links may be derived from the data size of the service request (and/or from the combined data size of a service request call and a response thereto) and/or on estimations of the capacity and/or activity of the one or more network links.

The size of a response to a service request may be used to predict the latency of transmitting the service request when they are known (for example when the response body has a fixed data size) are may be derived or estimated from a response size relationship (for example, where the data size of a response body is equal to a service compression factor multiplied by the size of the service request).

The plurality of microservices hosted on the plurality of networked resources may be some or all of the microservices, or microservice instances, of an application, such as a cloud native application. In preferred embodiments, the method, or routing policies are applied to all the network links between microservice instances (and service proxies thereof) of an application. Alternatively, the method or routing policies may only be applied to a subset of the microservice instances, network links and/or networked resources.

The plurality of networked resources may be computing hardware resources such as servers. The networked resources may be referred to as machines, or nodes. The resources communicate with each other via network, or via a plurality of intercommunicating networks. The one or more networks may be or may comprise one or more local area networks, wide area networks, wireless networks and/or cloud networks. In some embodiments the plurality of resources may be networked via one or more local area networks and one or more cloud networks. The plurality of networked resources may comprise local or edge resources and cloud resources. The service mesh may comprise a data plane and a control plane. The data plane may comprise a plurality of service proxies, each of which may be associated with one or more of the microservices (or one or more instances thereof) and via which service requests may be transmitted between the microservices (or instances thereof).

The control plane may monitor one or more performance characteristics of the network links, may generate the latency predictions and/or may generate from the prediction at the least one policy for routing one or more service requests in the service mesh. Network links and/or link performance characteristics may be monitored continuously or periodically.

The control plane may distribute policies to the proxies of the data plane which may specify rules for routing communications between the proxies. The control plane may thereby, and/or otherwise configure the data plane and/or the proxies thereof. The control plane may specify and/or implement load balancing, timeouts, retry and/or circuit breaker policies, may maintain a model of the microservices (for example, using a service discovery feature), may collect traffic metrics, may respond to queries from the data plane (such as authorisation, access control or quota queries), and/or may assign certificates to services.

The one or more monitored performance characteristics of the plurality of network links may include the activity of the network links (such as what proportion of a monitored time period they are in use), their maximum observed capacity (data transfer rate) and/or the latency of service requests via the network links.

The latency of a network link may be monitored by monitoring the latency of service-to-service communications transmitted via the network link. For example, the latency of a network link between a first resource, service instance and/or service proxy and a second resource, service instance and/service proxy may be monitored by monitoring or receiving the time at which a service-to-service communication is transmitted from a service instance (or service proxy associated therewith) hosted on the first resource and the time at which the communication is received by a service instance (or service proxy associated therewith) hosted on the second resource.

This may be performed by each microservice instance receiving a service request from a calling microservice instance adding a request received timestamp to the responses that they return to the calling microservice instance. Alternatively, for reciprocal links the timestamp may not be required, but the response may be returned immediately with no processing delay or with minimal processing delay compared with the link latency. Additionally, a link identifier identifying the network link via which the service request was sent may be embedded in the response or may otherwise be associated therewith.

As the latency of a communication transmitted by a network link will be dependent upon the size of the communication (in bytes), both the latency of a communication transmitted via the network link and the size of that communication may be monitored.

The latency of a network link may be monitored by the control plane, which may receive communications from proxies in the data plane indicative of transmission, receipt and/or latency times; for example, as part of telemetry received by the control plane from the data plane. The control plane preferably does not directly contact service-to-service communications (as is known in service mesh control planes).

The latency of a plurality of network links between resources of the plurality of networked resources are monitored. The plurality of network links may be some of, substantially all of, or all of the network links between the plurality of networked resources. The plurality of network links may be networks links between resources in one or more specific networks and/or network links between resources on different networks (which may provide bottlenecks between resources in use). The network link may be links of networks via which the resources communicate, and by extension links of the mesh network defined by proxies and/or data plane of service mesh. In some embodiments, the network links may be all the network links of one or more specific networks (such as local edge networks comprising some of the plurality of resources) and/or links connecting the one or more specific networks to other networks on which resources are hosted.

Generating a prediction of the latency of at least one of the plurality of network links may comprise generating a formula for a predicted latency as a function of the size of data of a service request (and/or of the data size of a response transmission expected thereto). Such a formula may be included in a routing policy generated by the method, which may thereby enable or cause service proxies to calculate a predicted latency for transmitting a service request via one or more routes when routing the service request. In some embodiments, the formula may be used to calculate a predicted latency for transmitting a service request to each of a plurality of microservice instances, or to each of all suitable microservice instances.

Such a formula may comprise dividing the sum of the size of a service request to be transmitted and a response message to be transmitted in response thereto by a link capacity (data transfer rate) of a link to a destination microservice instance. The capacity being measured in bytes per second. The link capacity of a network link may be predicted, for example, based on the maximum observed capacity of the link multiplied by an estimated link availability factor. The link availability factor may be predicted based on an observed link activity (or on a utilisation factor derived therefrom), which can be obtained on wireless or wired links by monitoring the proportion of an observation period for which the link is active. A link capacity may be calculated by converting from a link bandwidth in Hz, for example, using a known conversion factor.

For example, if a network link is monitored for an observation period of one second and the active time of the link is 400 milliseconds then the link utilisation factor is 0.4 and availability factor (equal to 1—the utilisation factor) is 0.6. Then if the maximum observed link capacity is 100 megabytes per second the predicted link capacity is 60 megabytes per second. If the sum of the data sizes of a service request to be routed and the response thereto total 30 megabytes then the predicted link latency will be 30/60=0.5 seconds.

Alternatively, or additionally, the latency of network links may be monitored by each microservice instance embedding receipt timestamps of service request messages into response messages sent back to the origin of the service request. In this way when microservice instances are invoked the latency can be explicitly measured and compared with predictions and the prediction assumptions may be updated accordingly. At the requesting microservice instance or service proxy thereof, the link latency may be measured based on the difference between sending and response timestamps. A link identifier or other means identifying the network link over which the service request is routed may also be embedded in the response or otherwise associated with the response message.

In some embodiments predictions of the latency, or formulas for calculating predicted latency, of a plurality of, or of all of, the network links may be generated.

The at least one policy for routing service requests in the service mesh comprise rules for selecting a destination microservice (or instance thereof) for a service request. For example, routing a service request may comprise selecting between a plurality of different instances of a single microservice, which may be hosted on different resources.

Alternatively, or additionally the at least one policy for routing service requests may comprise rules for determining a route from the origin of a service request to a destination microservice (or an instance thereof) over one or more networks therebetween. This may comprise selecting a path of network links from the origin to the destination, some or all of which may be network links of the plurality of network links monitored in the method.

The policy for selecting the destination microservice and/or the route to the destination microservice is preferably generated by the control plane and/or evaluated by a service proxy in dependence upon the prediction of the latency of at least one of the plurality of network links.

The network links are monitored in order to enable accurate predictions of the latency of transmitting a service request over them. For example, in order for predictions of the latency of transmitting a service request to a plurality of different microservice instances via a plurality of different network links to be made, estimates of the available capacity of each of the links to each of the service instances may be made. The predictions of the capacity of each link may be made using predictions of the utilisation and maximum capacity of the links. These predictions are preferably made by monitoring the links and making forecasts based on the type of link, the monitored performance of the link, and dynamic variation of the performance.

The policies for routing service requests are preferably based on minimising the latency or on minimising another cost function provided that the latency is below a target threshold, which may be dependent upon the role of the application or user making the service request. In order to account for role tailored use of the resources the use of microservice instances may be assigned based on exclusive use, that is certain microservice instances are reserved for certain roles, and/or prioritised use in which certain roles have preference. In the prioritised use approach, the routing policies could limit the number of lower priority service invocations of specific microservice instances (and/or resources on which they are hosted) over a period of time. For example, in a one second time period only one hundred invocations of a microservice instance may be permitted. The information regarding the throttling behaviour is embedded into the policies. Likewise, for minimising the overall latency it is necessary to consider all microservice instances that are permitted destinations for a service request based on the role of the requester. The role is embedded into the service request message to permit the evaluation of the policies by a service proxy.

If a routing policy is only concerned with meeting a target latency then the cost function that can be minimised may take account of all permitted service instances for that requested role. The cost function could, for instance, aim to use resources that are nearer (few link hops) to the service instance or are farther away from reaching the throttling limit, that is have fewer prior invocations over the period.

Microservices each perform a specific task and microservice instances may therefore may issue service requests to other microservices. For example, an analytics service may use and issue service requests to other analytics services, to sensor observation services, and/or to localisation services. This may result in a chain of service requests, such as where a first microservice instance issues a request to a second microservice instance which causes the second microservice instance to issue a service request to a third microservice instance.

The method may comprise the step of distributing the generated policy to a plurality of service proxies, which may be comprised by the data plane of the service mesh.

The method may comprise the step of the service proxy evaluating the policy or rules thereof to route a service request in the service mesh.

The policy may comprise a latency threshold for a service request which may be derived from the prediction.

For example, if a network link's predicted latency (or the sum of the network link's predicted latency and other predicted sources of latency) exceeds a threshold latency for the service request, that link (and/or a resource to which that link leads) may be excluded from a list of possibilities for routing the service request. In embodiments where the latencies of a plurality of network links are predicted, if the combined predicted latency of a route from the origin of the service request to a destination exceeds a threshold route latency for the service, that route (and/or a resource to which that route leads) may be excluded from a list or possibilities.

In addition to the predicted latency of one or more network links, the routing of the one or more service requests (the selection of a destination microservice and/or a route thereto) may depend on additional factors. These additional factors may include parameters of the service request, of one, some, or all of the plurality of resources, and/or of the one or more networks. For example, in addition to routing service requests to reduce their latency (or to reduce the latency of specific latency critical requests), the service requests may be routed to achieve load balancing.

The routing of service requests may also be dependent upon the role of the requestor, which may correspond to a resource utilisation priority which may differ between requestors, roles or requestors and/or service requests. For example, the same service requests made by different requesters with different roles may have different latency requirements or priorities. The role information can be used to prioritise use of resources or network links or to prevent or limit the use of certain resources by certain requesters or roles thereof when insufficient amounts of specific types of resource, such as local edge resources, are available.

In preferred embodiments, the routing of some or all of the one or more service requests is dependent upon the requestor of that service request or on the role of the requestor. For example, a threshold latency of a service request against which a predicted latency is compared may be dependent upon the role of the requestor. In some embodiments requestors or roles thereof may be identified by the service request, or by components, such as access tokens thereof.

The requestor may be the microservice initiating the service request, or an application outside the service request making an ingress service request via an ingress gateway. The role of the requester is dependent upon the application and/or user making the service request, or if the service request is one of a chain of service requests, the application and/or user who made the initial service request of that chain. Each chain of service requests may be associated with a single role dependent upon the initial requestor, even though it may be a long chain of service invocations. The role may be embedded into each service request of the chain.

Some or all of the microservice instances intercommunicating via a service mesh may be usable and requestable by a plurality of different applications. The routing of service requests may therefore be dependent upon the requesting application or role thereof, allowing microservice instances (such as those with low network latencies to the requesting service proxy) to be prioritised for high priority applications or roles.

In some embodiments access tokens may be embedded within one, some or all service requests. Access tokens may authorise the service request to access specific network links or resources which would otherwise be restricted. The access token may contain the identify or role of the requestor of a service request. Specific resources and/or network links may be prioritised for and/or restricted to specific requestors or requestor roles.

The service mesh may comprise or be configured to perform any of the optional features described above with reference to the method of the first aspect.

The method or service mesh may advantageously route service requests in a service mesh hosted on a wireless (or otherwise dynamic) network based on network performance predictions. This is particularly advantageous in situations where network bottlenecks are possible and/or where network latency contributes significantly to overall request latency.

In networks comprising dynamic elements, such as local wireless networks or hybrid networks comprising cloud resources as well as local edge resources, it is possible to predict performance changes of individual wireless network links, which may only effect individual nodes of the network. Predictions of wireless network performance can also be made using models of the radio environment. For example, by monitoring radio activity or interference and the location of nodes in an environment it is possible make to forecasts of the performance of network links. These forecasts may capture dynamic variations in network link performance, which may impact on service instance selection, without the microservice instance needing to be invoked beforehand so as to provide communication via the network link to monitor.

In some situations, service mesh applications may be deployed on hybrid edge cloud networks comprising cloud based and local resources, instead of on a solely cloud based network. Cloud networks may be extended to local edge resources by using services such as KubeEdge® (Kubernates® on the edge). The local network connections between local edge resources may offer a high bandwidth and lower latency performance than the wide area connection of the cloud resources. Utilising local edge resources and network links may therefore achieve lower latencies than using cloud based resources. Cloud edge resources and the network links therebetween may therefore be used for latency critical requests and the more cost effectively dynamically scalable cloud resources may be used less latency sensitive requests. This approach may more dynamically and appropriately exploit resources in microservice meshes deployed on hybrid cloud/edge networks.

To effectively determine whether to assign a microservice or service request to a local resource or network link, or to a wide area network resource of network link, it is useful to estimate the performance of at least the local portion of the network and to determine whether network connections present significant performance bottlenecks which will increase the request latency. In preferred embodiments the performance of all network links are estimated.

If a connection between the local edge resources and cloud resources is identified as a bottleneck, whether to deploy and/or request microservices on edge resources or on cloud resources may be determined to achieve overall performance goals.

In some situations, local edge resources may be utilised in preference to cloud resources. The optimal load balancing policies between the cloud and edge resources can then be determined in order to share the combined cloud/edge resources more efficiently.

Routing service requests based on predictions of network link latencies therefore advantageously allows resources of a hybrid cloud/edge network as described above to be more dynamically and appropriately exploited by the service mesh of a microservice based application.

Microservice service mesh based applications are advantageously more flexible than traditional monolithic applications and their fine granularity allows the location where processing is to be performed to be dynamically selected. Therefore, a microservice application provides more options for determining which functions of the applications (implemented as microservices) are performed on edge local resources, and which are performed on cloud resources. However, this finer granularity of microservice based applications requires larger volumes of inter-service requests that must be considered in order to determine optimal resource sharing policies.

FIG. 1 shows the architecture of an Internet of Things (IoT) edge service mesh network 600 comprising a physical network layer 610, a virtual data sharing and computation layer 630, and a plurality of tasks 650, wherein each task (or application) 650 uses a set of services.

The physical network layer 610, comprises edge processing nodes 614, IoT network gateways/routers 612, and various different IoT devices 616. In the data sharing and computation layer 630, these devices 612, 614, 616 together define an IoT edge service mesh network, with virtual connections 632 between virtual service proxies 634.

Each edge processing device 614 may be used by one or more computational tasks or applications which are distributed over a plurality of processing devices, in the form of a microservice architecture comprising a plurality of microservice instances hosted on the edge processing devices 614 connected via the physical network 612.

When a task 650 is to be performed, which devices in the network should be involved may be calculated and the task may then be partitioned into multiple computation and data sharing subtasks or services which may be assigned to some or all of the edge processing devices 614. The service proxies 634 may decide to invoke different actual service instances, residing on different physical processing devices 614, based on the task or application to which the requested service invocation relates.

An edge service mesh is defined between the microservice instances. The service mesh permits transmission of service requests between the microservice instances on the processing resources 614 on which they are hosted using the service proxies 634.

Microservice instances may be hosted on virtual resources in the cloud. In an IoT edge service mesh virtualisation of the computing environment may be performed. The network resources may also be virtualised such that routing of the service requests is not aware of physical network links. However, in present embodiments, the service proxies and/or other elements of the service mesh may be aware of which physical links connect which virtual computing resources, this may be used to facilitate predicting the latency of transmitting service requests to different destinations hosted on different virtual computing resources.

Figure 2A:
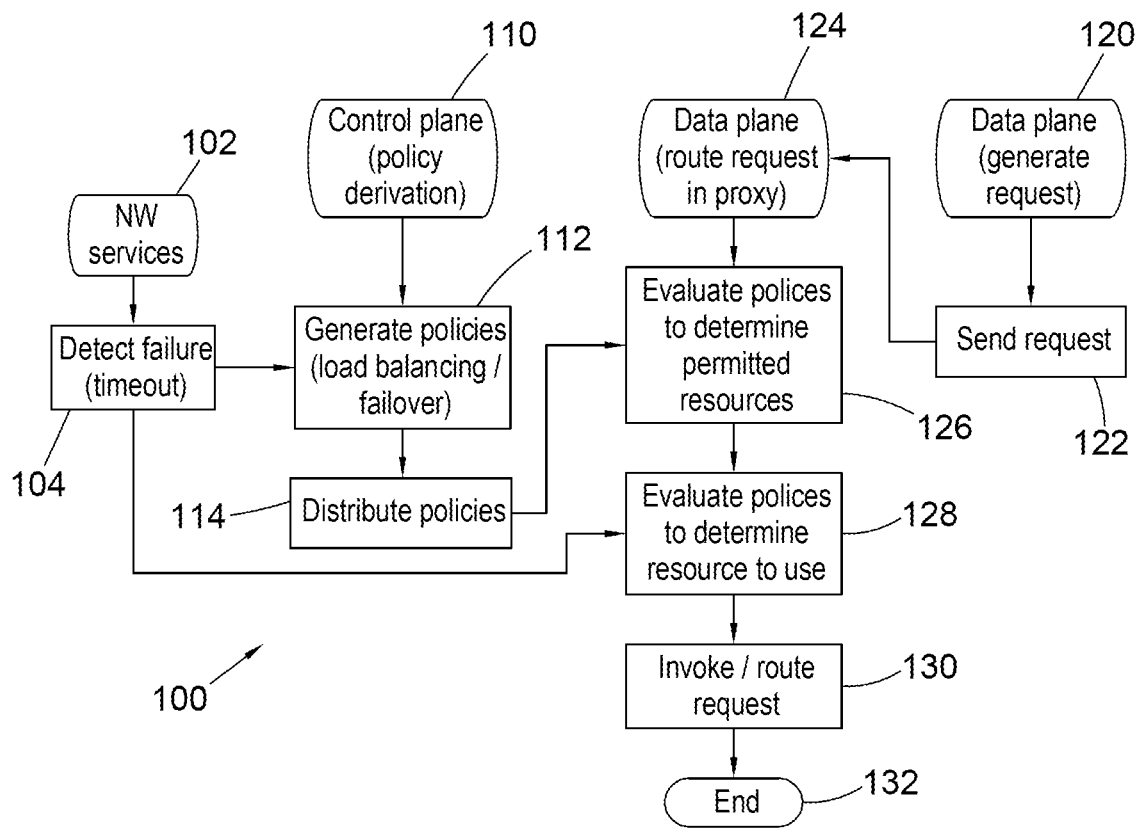

FIG. 2*a* is a flow diagram showing a known process 100 of sending a service request in a microservice architecture application using a service mesh.

The microservice architecture comprises a plurality of microservice instances hosted on hardware resources such as servers which communicate with each other via one or more networks. The microservice instances communicate with each other via a service mesh comprising a data plane 120 and a control plane 110.

The data plane 120 comprises a plurality of service proxies, each associated with one of the microservice instances or a group or pod of microservice instances hosted on the same resource. In use, service-to-service communications are transmitted within the data plane 120 between microservice instances via their associated proxies. The control plane 110 monitors the data plane 120 and generates and deploys policies for controlling the behaviour of the service proxies in the data plane 120. The control plane 110 does not directly interact with the service-to-service communications within the data plane 120.

Network monitoring services 102 are provided to detect failure of nodes within the service mesh network. These may be provided by sending ping or heartbeat signals to each of the microservice instances, for example from a central or master node, and detecting whether a response signal is received, for example, within a specific window of time. In the event that the response signal is not received, a failure of the microservice instance is detected. The failure may be communicated to each of the service proxies of the data plane 120, for example over the control plane 110. Subsequently, all service request invocations may avoid the microservice instance whose failure was detected.

In use, the control plane 110 generates 112 policies and distributes 114 them to the service proxies of the data plane 120. The policies comprise rules for the service proxies to determine how to route service-to-service communications within the mesh defined between the service proxies 120 in the data plane. For example, the policies may provide rules for selecting which of a plurality of instances of a microservice to route a request to and for selecting a route from the communications origin to the selected destination. The policies are generated 112 to provide load balancing between the resources and to provide failover in response to the detection 104 of failures of network links or processing nodes by the network proxies.

The routing of a service request within the service mesh begins with the generation 120 of the request. The request is issued by a microservice instance, or an external application via an ingress gateway, to another microservice of the service mesh or an external resource. The destination microservice or external resource may be identified by a Uniform Resource Identifier (URI). While the request is issued to a specific microservice, it is not issued to a specific instance of a microservice and does not specify a route by which it should be transmitted. Which of a plurality of instances of the destination microservice (which may be hosted on different resources) the request is to be routed to, and by which route from the issuing microservice or application (ingress gateway) to the destination microservice it is to be routed must therefore be determined. This is performed by a service proxy implementing policies provided by the control plane of the service mesh.

The issued service request is intercepted 124 by the service proxy associated with the issuing microservice or gateway and/or by a virtual service. A virtual service is a set of routing rules applied to a service request addressed to a specific host address. For example, a virtual service may be a set of routing rules applied to determine which instance of a microservice to route a service request to when the service request is addressed to a specific microservice. A virtual service is preferably comprised by a policy which may be generated and/or distributed by the control plane of the service mesh.

A virtual service may call multiple microservice instances in sequence if necessary to accomplish a task. For example, an image tracking task may require processing of multiple frames of video captured by one or more cameras. Individual frames or sets of frames may be processed by different microservice instance. The virtual service may abstract this distribution away from the microservice or application issuing the service request.

The service proxy and/or virtual service is responsible for routing the service request. Routing the service request comprises a first step of evaluating 126 the policies generated and distributed by the control plane 110 to determine which resources and microservices hosted thereon are suitable and permitted destinations for the service request. The routing subsequently comprises a step of evaluating 128 the policies to determine which of the permitted resources the service request should be routed to. If any timeout failures have been detected 104 and communicated to the service proxy as described above, the microservice instances whose failure was detected are discounted. A destination resource and microservice instance hosted thereon may be selected from suitable undiscounted resources using a randomisation method to evenly distribute service requests, thereby performing load balancing between the resource on which the service mesh is hosted.

Subsequently, the selected service instance is invoked by routing 130 the service request to the selected microservice instance, the service proxy which routed 130 the request may obtain a response to the invocation.

The generation and evaluation of routing policies based on network performance and dependent upon requestor roles are not conventionally performed in service meshes controlling communications between microservice instances. These service meshes use policies designed to route requests to perform load balancing or handle failover.

Figure 2B:
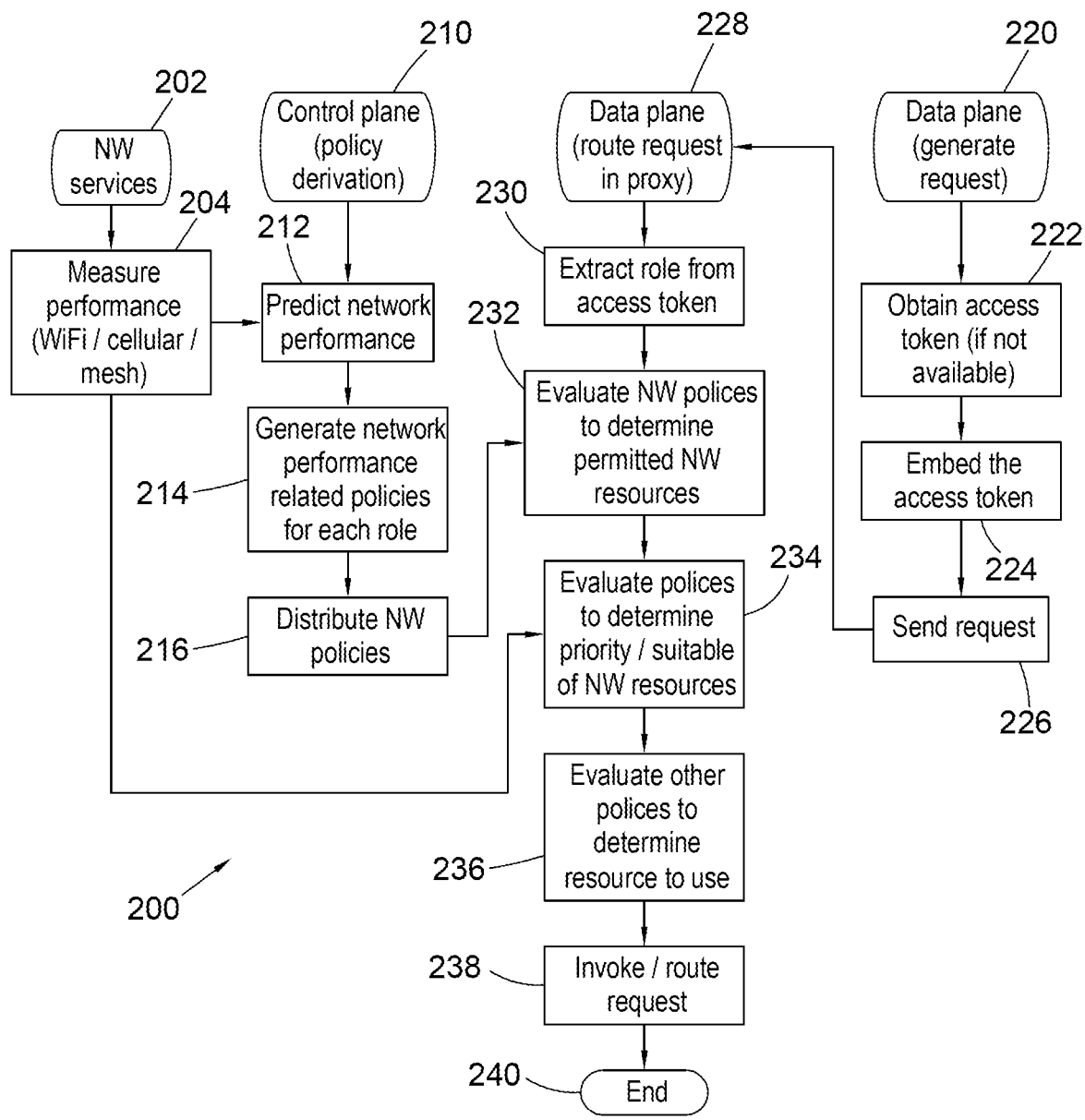

FIG. 2*b* is a flow diagram shows an embodiment 200 of sending a service request in a microservice architecture application using a service mesh.

As with the application and service mesh described above with reference to FIG. 2a, the microservice architecture application comprises a plurality of microservice instances hosted on hardware resources such as servers which communicate with each other via one or more networks. The microservice instances communicate with each other via a service mesh comprising a data plane 220 and a control plane 210. The one or more networks may include one or more networks with dynamic performance, such as local cloud edge network, wireless network, or cellular network.

The data plane 220 comprises a plurality of service proxies, each associated with one of the microservice instances or a group or pod of microservice instances hosted on the same resource. In use, service-to-service communications are transmitted within the data plane 220 between microservice instances via their associated proxies.

The control plane 210 monitors the data plane 120 and generates and deploys policies for controlling the behaviour of the service proxies in the data plane 120, including the routing of service requests thereby. The control plane 110 does not directly interact with the service-to-service communications within the data plane 120.

The control plane 210 may include, may connect to, or may be configured to connect to an API, command line interface, graphical user interface or other means for a user or external service to configure or otherwise control the behaviour of the control plane.

Network monitoring services 202 are provided for monitoring failures of nodes and performance characteristics (such as capacity and activity) of links of the service mesh network.

The detection of the failure of nodes may be performed by a central ping or heartbeat signal as described above with reference to FIG. 2; however, it is preferably instead performed by the service proxies. The service proxies may transmit heartbeat or ping signals to each other and detect a failure if a response signal is not received, for example, within a specific period of time.

Alternatively, or additionally, the service proxies may detect a failure when a service request to a destination microservice instance times out (for example, when an expected response to the call is not received by the calling service proxy within a specific window of time, such as two seconds).

The service proxies detecting failures instead of a central or master node may advantageously both detect when a node fails, or when a link from the service proxy to the node fails, though individual service proxies cannot independently detect which of these failures has occurred.

In the event that such a failure is detected by a service proxy, it may be communicated over the control plane 210 to each of the service proxies of the data plane 220. Subsequently, all service request invocations may avoid the destination microservice instance to which the ping, heartbeat or service request signal failed due to the network or node failure.

The network monitoring services 202 also measure the performance of network links between resources and the microservice instances hosted thereon on one or more of the one or more networks.

In preferred embodiments, the capacities (data transfer rates) of the network links are measured and/or estimated (for example, using a heartbeat ping for each of the links individually) and the activity on each of the network links is observed and/or measured. The capacity and activity of a network link may be used to predict an effective available capacity of that link, as this will vary over time. The effective available capacity may be used to estimate the latency of transmitting a service request of a given data size via that network link.

The measured performance characteristics of the network links may be communicated to the control plane 210, where they be used to generate routing policies, and/or to the service proxies of the data plane 220, where they may be used to evaluate routing policies.

The measurements 204 of the performance of the network links (such as maximum capacity) may be used by the control plane 210 to generate 212 predictions of the future performance (such as utilisation or availability factors, and/or estimated link capacity and/or latency) of the network links. The control plane may then use the generated predictions to generate 214 policies comprising rules for the service proxies to determine how to route service-to-service communications therebetween. The control plane may generate 214 different such policies for each of a plurality of requester roles.

The policies may provide rules for selecting which of a plurality of instances of a microservice to route a request to and for selecting a route from the communications origin to the selected destination. As described above, the policies may be generated 214 to provide load balancing between the resources and failover in response to the failure detections 104, in addition to minimising request latencies, or achieving desired request latencies for service requests from requestors of each specific role.

The policies are then transmitted 216 to the service proxies in the data plane 220 where they may update or replace existing routing policies being used by the proxies.

As in FIG. 2a, the routing of a service request within the service mesh begins with the generation 220 of the request. As described above, the request is issued by a microservice instance or an application (ingress gateway) to another microservice which may be identified by a Uniform Resource Identifier (URI). While the request is issued to a specific microservice, it is not issued to a specific instance of a microservice and does not specify a route by which it should be transmitted. Which of a plurality of instances of the destination microservice (which may be hosted on different resources) the request is to be routed to, and by which route from the issuing microservice or application (ingress gateway) to the destination microservice it is to be routed must therefore be determined. This is performed by a service proxy implementing policies provided by the control plane 210 of the service mesh.

When the request is generated, an access token identifying the role of the application or user making the service request is embedded 224 within the service request. If an access token is not available when the service request is generated, the appropriate access token is obtained 222 before being embedded.

The access token can be obtained from an API manager which manages the subscription of applications to use the APIs provided by microservices. The APIs can be previously published within the API manager by the microservice providers. The applications are then used by the end users who register to utilise the application through the API manager or another application portal or identity provider that can confirm the user identity.

Once the user registers to use an application that is already authorised and has subscription to utilise certain microservice APIs the token is generated by the API manager that embeds the user and application role and is included in the requests from the application to the service mesh. It is subsequently not necessary to obtain a new token until expiry. The application then sends a service request to the service mesh that includes the embedded token. The service request is intercepted 224 by a service proxy and/or virtual service which routes the service requests. Routing the service request comprises a first step of extracting 230 the role of the requestor from the access token embedded within the request.

The policies supplied 216 to the proxy by the control plane 210 are then evaluated 232 to determine which resources and microservices hosted thereon are suitable and permitted destinations for the service request transmitted by the requestor of the role identified by the access token.

The routing subsequently comprises a step of evaluating 234 the policies to determine the priority or suitability of the resources. For example, a policy for a requester role which transmits latency critical service requests may prioritise resources which may be accessed from the origin of the request via a route of network links with a low combined latency.

In some embodiments, if any timeout failures and/or other changes in the performance of the network (such as changes in the maximum capacity of network links) are detected 204 by the network monitoring services 202, information as such may be transmitted to the proxies and used to evaluate 234 the policies.

This network performance estimate 204 also permits derivation of link utilisation factors (dependent upon what proportion of the time a network link is in use) and predictions of actual capacity or latency 212 of individual network links. These factors and predictions may then be used in network link selection policies 214 generated by the control plane and distributed 216 to the service proxies. The service proxies in the data plane perform service request routing that may comprise evaluating latency targets against combination of actual network capacity or latency 232, maximum capacity 234 and any other policies 236 to determine which destination resource to select, for example other policies relating to processing resource availability, load balancing and prioritisation or throttling.

Subsequently, the service proxy or virtual service, which intercepted the service request and evaluated the routing policies, invokes the selected destination microservice instance by routing 238 the service request to the selected destination microservice instance over the selected network links and obtaining a response to the invocation.

This approach to routing service requests uses the predicted performance of individual network links and application role information in order to dynamically and appropriately route service requests within the network. This approach includes enhancements within the authorisation and the policy derivation and evaluation logic.

Microservices may be utilised in applications hosted on hybrid cloud/edge networks to perform more rapid and efficient execution of service requests. This may reduce the latency of service requests and may adaptively utilise different wireless network infrastructures, such as WiFi® networks or cellular or radio mesh networks. Such microservices may be used in retail use cases with applications and service meshes on hybrid networks comprising cloud resources and local store edge resources.

Figure 3:
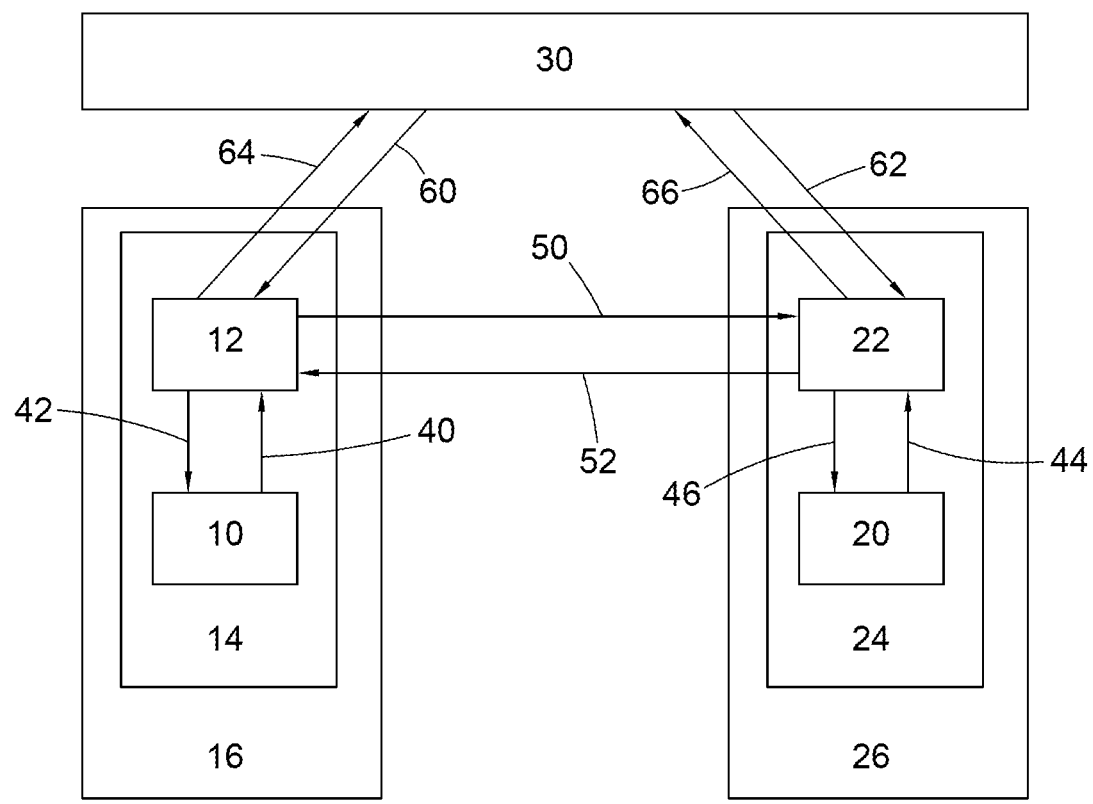
FIG. 3 shows elements of a service mesh within which service request are routed according to predictions of the performance of network links.

FIG. 3 shows a pair of microservice instances 10, 20 of a microservice architecture application, a pair of separate networked hosts 16, 26 on which the microservice instances 10, 20 are hosted, and elements of a service mesh via which the microservice instances 10, 22 are able to communicate.

Service requests are routed within the service mesh according to predictions of the performance of network links. The service mesh controls communications between a plurality of microservice instances 10, 20 and/or other elements such as ingress gateways, by or to which service requests may be made in use.

The service mesh comprises a control plane 30 and a data plane. The data plane comprises a plurality of service proxies 12, 22 and communications 50, 52 therebetween. In FIG. 3 two of the plurality of service proxies 12, 22 are shown, each associated with a single microservice instance 10, 20. It will be appreciated that the service mesh may comprise any number of service proxies 12, 22 and that the number of service proxies may vary as microservice instances 10, 20, containers 14, 24 and/or service proxies 12, 22 are deployed or destroyed. Each service proxy 12, 22 is associated with a microservice instance 10, 20 (or with another element such as a gateway). Some or all of the service proxies may be associated with a group or pod of microservice instances 10, 20 and/or other elements hosted on the same host 16, 26.

The service mesh may span one or more networks, each of which may comprise one or more clusters of multiple physical 16, 26 or virtual 14, 24 machines. Each physical 16, 22 or virtual 14, 24 machine may host one or more service proxies, each associated with a single microservice instance or a group or pod of multiple microservice instances. The service mesh may comprise one or more gateways via which service requests may enter and/or exit a cluster of machines, either to or from other clusters of the service mesh or to or from outside the service mesh. Each gateway may be associated with or applied to a proxy which may route service requests entering the cluster via the gateway or to which service requests for destination outside the cluster may be routed.

The service mesh may comprise a plurality of control plane instances each of which may connect to, communicate with, and/or configure the service proxies within one or more clusters. In the event that one control plane instance becomes unavailable, the service proxies associated therewith may switch to another control plane instance, providing fail over.

The microservice architecture application comprises a plurality of microservice instances 10, 20 and optionally other elements such as gateways, which are hosted on a plurality of networked hosts 16, 26 such as servers. The microservice instances 10, 20 (or other elements) and their associated service proxies 12, 22 are hosted within containers 14, 24 on the hosts 16, 26. Alternatively, some or all of the microservice instances 10, 20 (or other elements) and their associated service proxies 12, 22 may be hosted within virtual machines on the hosts 16, 26.

Each service proxy 12, 22 communicates with its associated one or more microservices 10, 20 or other elements, in order to receive 40, 44 and route communications originating therefrom or to deliver 42, 46 communications routed thereto. Each service proxy 12, 22 also communicates with the control plane 30, in order to transmit 64, 66 telemetry and/or monitoring information thereto, to receive 60, 62 policies and/or certificates therefrom, and/or such that the control plane is able to provide authentication checks for the data plane or to log route traffic within the data plane. The control plane may be hosted on and/or implemented by a dedicated controller.

The service proxies 12, 22 communicate 50, 52 with each other via network links between the hosts 16, 26 on which the microservice architecture application is hosted. The service proxies 12, 22 define a virtual mesh network between themselves via which the communications are transmitted, with virtual network links of the mesh network mapping onto physical network links between the hosts 16, 26.

In use, when a service request is made by a first microservice instance 10, hosted in a first container 14 on a first host 16, the service request is transmitted to and intercepted by a first service proxy 12 associated with the first microservice instance. The first service proxy 12 then evaluates a routing policy which was distributed 60 to the service proxy 12 by the control plane 30.

Evaluating the routing policy preferably comprises predicting the network latency of transmitting the service request to a plurality of different suitable destination microservice instances and/or via a plurality of different routes through the service mesh to destination microservices. The predicted network latency of routing the service request to each of the destination microservices may then be summed with a processing latency of making the service request to that destination microservice, in order to obtain a predicted total latency. A destination microservice 20 may then be selected utilising the predicted total latencies, for example the destination microservice with the minimum predicted total latency may be selected, or one of a plurality of destination microservices with minimum predicted total latencies below a threshold latency may be selected (for example, using a load balancing or randomisation method).

The first service proxy 12 then calls 50 the service proxy 22 associated with the selected destination microservice instance 20 and the destination service proxy 22 transmits 46 the call to the destination microservice instance 20. The destination microservice instance 20 then transmits 44, 52, 42 a response to the call back to the originating microservice instance 10 via the service proxies 12, 22.

Figure 4:
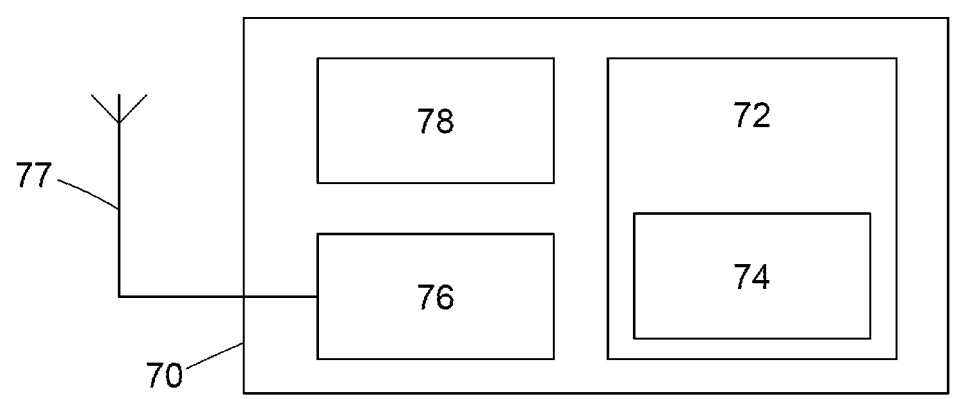
FIG. 4 shows a device for performing steps of the method.

FIG. 4 shows a device 70 for implementing steps of the method of the present invention.

The device 70 comprises an input/output module 76, processor 78 and a memory 72. The input/output module 76 is communicatively connected to an antenna 72, which is configured to receive signals from, and to transmit signals to other devices in communication with the device 70 using one or more networks. The processor 78 is coupled to the input/output module 76 and to the memory 72. The memory 72 stores computer program instructions 74 that when executed cause the processor to implement one, some or all of the steps of a method described herein. The device may comprise other communication means communicatively connected to the input/output module 76 in addition to or instead of the antenna 72.

For example, the input/output module 76 of the device may receive information on transmissions via a plurality of network links which may contain monitored performance characteristics of the network links, or from which the processor 78 is able to derive performance characteristics. Operating under the instructions 74 in the memory 72, the processor 78 may generate predictions of one or more performance characteristics of the network links (such as their capacity or latency) and/or may route a service request or generate a routing policy for service proxies.

The device 70 may be a controller which may implement the functions of a control plane of a service mesh. The input/output module 76 may receive communications from the plurality of service proxies of the service mesh, the communications may include monitored performance characteristics of network links over which service requests are transmitted between the service proxies, the processor 78 may then use these monitored performance characteristics for generating routing policies for routing service requests according to latency predictions of the network links.

Alternatively, the device 70 may be one of a plurality of hosts on which one or more service proxies (and the microservices or other elements associated therewith) are hosted. The device may receive routing policies from a control plane via the input/output module, which may be stored in the memory 72 as instructions 74, and which the processor 78 may evaluate to predict the network latency of network links between service proxies in the service mesh and to route the service request to a destination.

Figure 5:
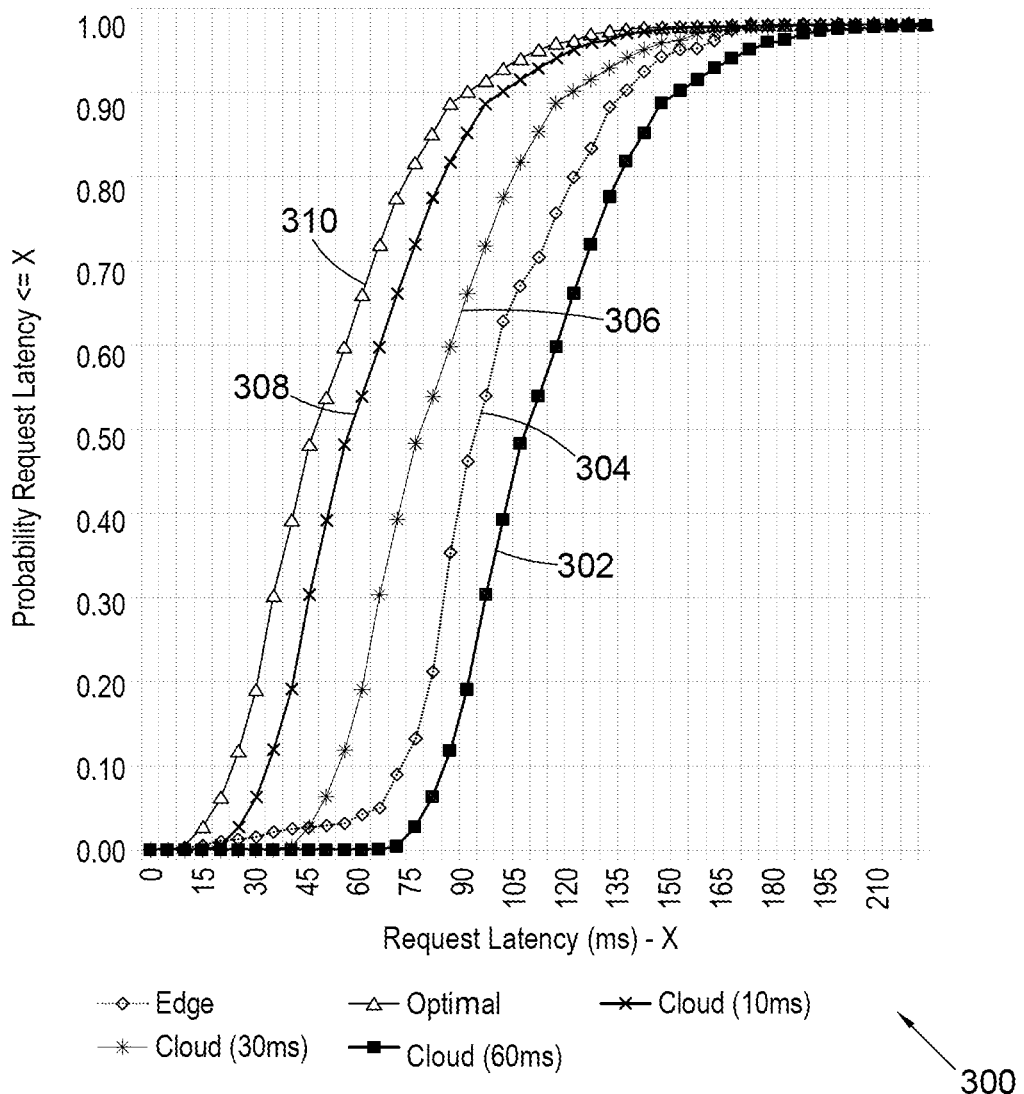
FIG. 5 is a graph illustrating the latency performance of sets of microservice requests.

FIG. 5 is a graph 300 illustrating the latency performance of sets of 100 microservice requests made simultaneously (within a virtual application and service mesh) on a cluster of resources that comprises three times as many cloud computing resources as local edge resources. Five different scenarios were modelled, one using only the local edge hosted microservice instances 304, three using only cloud housed microservice instances 302, 306, 308 and one optimal scenario using both cloud and edge hosted microservice instances 310.

In the three cloud hosted microservice instance only scenarios 302, 306, 308, the network latency between the cloud resources was varied between the scenarios in order to illustrate the impact network latency has on overall service request latencies. These scenarios assumed fixed network latencies of 10 ms 308, 30 ms 306 or 60 ms 302. These different assumed network latencies could correspond to different data sizes of transmitted requests and responses or different network capacities.

The network latency between the edge hosted microservice resources was assumed to be negligible.

In the scenario labelled "Optimal", the destination microservice instance of each service request was selected to minimise total latency and to load balance between cloud and edge resources. The policies evaluated by the service proxies routing the service requests made predictions of the processing latency of microservices hosted on edge resources and on cloud resources and also of the network latency of routing service requests thereto. The policies thereby optimally load balanced between the processing and network latencies.

The network latencies were predicted based on the size of the transmitted requests and response and on estimates of network capacity and utilisation, where the message sizes were evenly distributed between three possible sizes: 1.2 megabytes, 0.6 megabytes and 0.2 megabytes and the network capacity was fixed at 20 Megabytes per second. The latency minimising policies therefore routed service requests to cloud service hosted microservice instances when the request/response message size was equal or less than approximately 0.6 megabytes, and to local edge resource hosted microservice instances otherwise. This is due to the policies splitting services requests between edge and cloud based processing resources in order to provide optimal load balancing and minimise total latency.

If the maximum or available network capacity varied dynamically, then predictions of network utilisation and available capacity in the evaluation of the routing policies could permit adapting the selected microservice instances to still achieve the optimum split between cloud and edge resources.

An alternative example type of routing policy that may be evaluated by the service proxies is to select a destination microservice instance resource that satisfies a hard target latency constraint, in the form:

IF(NW.latency+processing.latency>target.latency)
then EXCLUDE

Where NW.latency is the predicted maximum network latency of all of the network links from the origin of a service request to a target microservice instance, processing.latency is the maximum latency of the target resource processing the service request, and target latency is a maximum threshold total latency below which the service request must be performed within. This policy may be applied to a plurality of, or all of the potential target resources, and resources with a combined predicted latency exceeding the threshold may then be excluded from consideration.

The routing policies are evaluated for each service API call and therefore apply for each hop or invocation between microservice instances. Different constraints may be applied to each microservice within a service mesh.

Each service proxy may compute the route for a service request to the next service instance or proxy associated therewith. Routing decisions may be made using local information, which may be monitored by the service proxy routing the service request, and/or by the potential destination service proxies, and which may not be available to some or all of the other service proxies within the service mesh, and may not require global knowledge link performance of the entire service mesh. This may allow the service proxy routing a service request to only require monitoring of, information on, and/or predictions of the performance of the network links from that service proxy the service proxy does not require this knowledge of other links within the service mesh, which would otherwise limit the scalability of the service mesh.

Each service instance, gateway, and/or service proxy is preferably able to make a service request to any other service instance in the virtual network. Each service instance is therefore preferably logically one hop away from the origin of a service request, even if such a network link in the service mesh may correspond to a plurality of physical link hops which are abstracted away from links in the service mesh.

In situations where the latencies are dependent upon the priority of the service request (which may be dependent upon the role of the user or application making the service request), the policy may be of the form:

IF(NW.latency[role]+processing.latency[role]>
target.latency[role])then EXCLUDE

Where target.latency[role] is a maximum threshold total latency below which the service request must be performed when requested by an application or user with a given role. NW.latency[role] and processing.latency[role] are the predicted maximum network latency of all of the network links from the origin of a service request to a target microservice instance, and the maximum latency of the target resource processing the service request respectively.

This allows role based prioritisation in the routing of service requests. Service requests from requestors with higher priority roles will be routed to destinations with lower total latencies in preference to service requests from requestors with lower priority roles. The latency of requests may by higher priority requestors will therefore be lower than those made by lower priority requestors. Alternatively, one or both of the network latency and the processing latency may be independently prioritised based on the role of the requestor.

Some or all of the microservice instances intercommunicating via a service mesh may be usable and requestable by a plurality of different applications. One, or some of these applications may cost more, may offer better performance, and/or may provide a premium service. Different applications may use and request given microservice instances for the same purpose, or for different purposes. For instance, a traceability application may be used to set off an alarm when an item is removed from a shop. However, the same microservice may be used by a different application to perform analytics to monitor where most people spend time browsing. The latency targets for the different applications and roles may differ significantly. The role of the user of a shop lifting application may be security whereas the role of a retail analytics application may be marketing or store layout management. Hence the network and processing resources offering lower latencies can be prioritised to give higher priority to the more latency critical roles. For instance, real-time service versus best effort.

Figure 6:
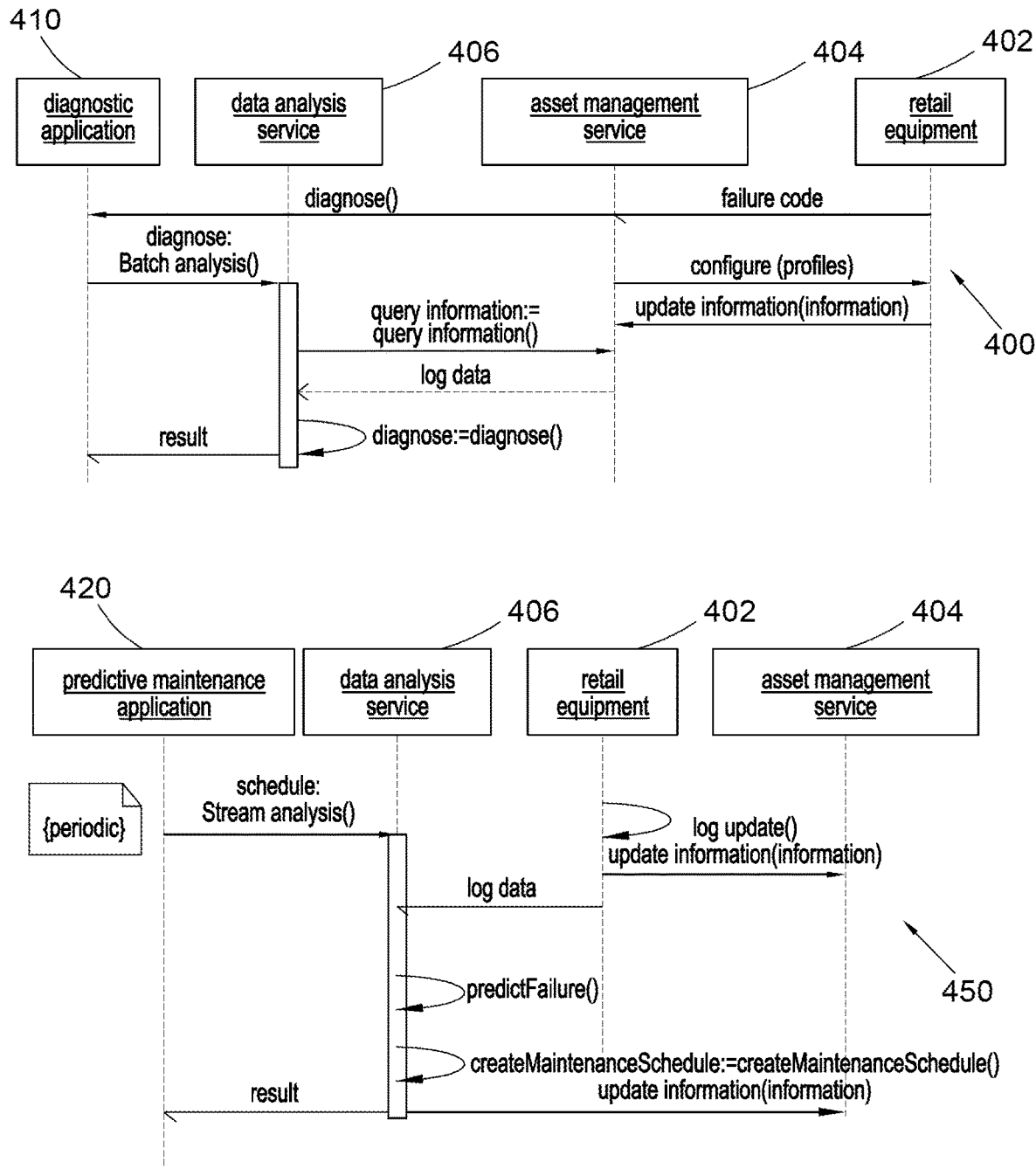
FIG. 6 shows sequence diagrams of request sequences in a diagnostic application and a predictive maintenance application.

FIG. 6 shows sequence diagrams 400, 450 of example service request sequences in a diagnostic application 410 and a predictive maintenance application 420 running in a store to monitor retail equipment 402.

The diagnostic application 410 and the predictive maintenance application 420 each utilise data analysis and asset management services 406, 404 which are process intensive operations implemented as microservices to be run on local edge resources and cloud resources.

In the event of a failure being detected in the retail equipment 402, the diagnostic application 410 is triggered and is then of a higher priority than the periodic predictive maintenance application 420. The predictive maintenance service requests are therefore routed to microservice instances hosted on cloud resources while the diagnostic service requests are run as a higher priority role and are routed to microservices on edge processing and network resources.

Additionally, in the event that the wireless network connection interconnecting the local edge resources becomes a bottleneck (due to a decline in performance or a bandwidth limit being reached) then service requests with the higher priority diagnostic application role are permitted to make use of the microservices that retrieve the log data from the asset management microservice at a high priority and in preference to the lower priority predictive maintenance application.

Figure 7:
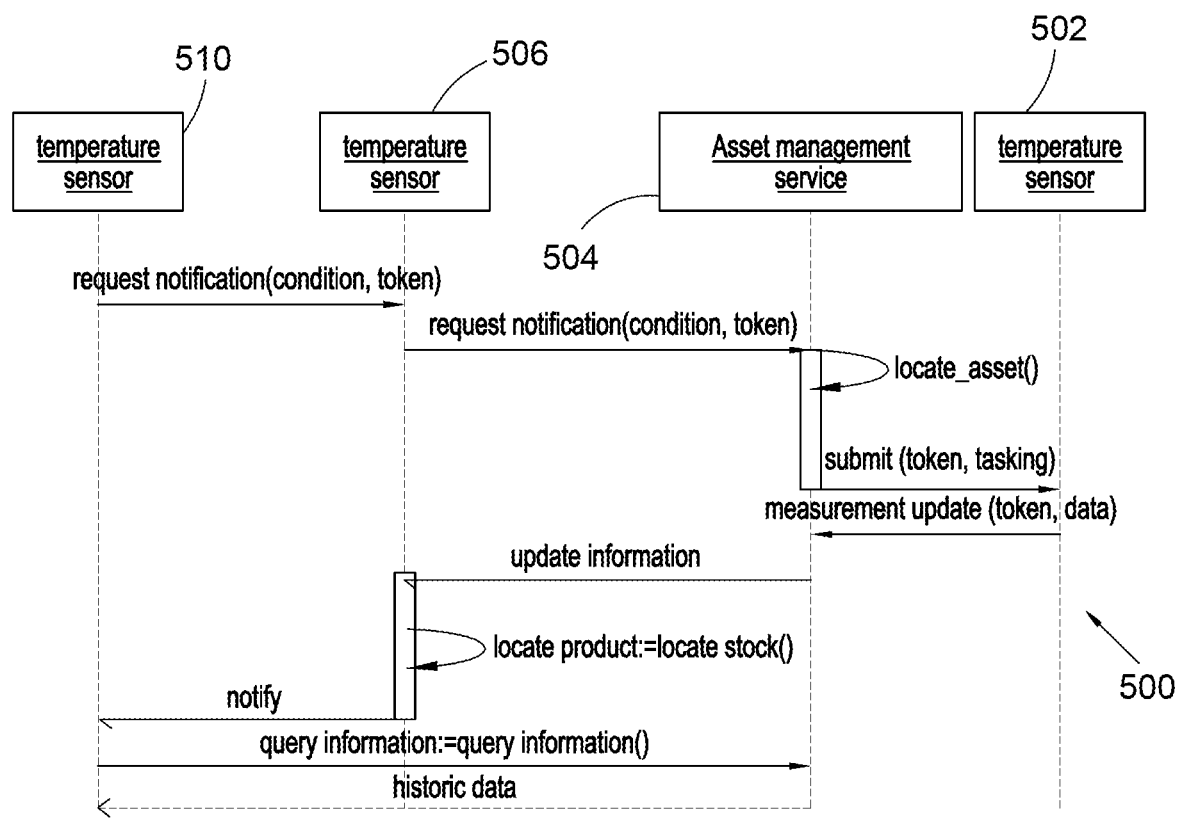
FIG. 7 shows a sequence diagram 500 of a service request sequence in a traceability application.

FIG. 7 shows a sequence diagram 500 of a service request sequence in a traceability application 510 which utilises a Sensor Observation Service (SOS)/Inventory service 506 and an asset management service 504.

The application is utilised in a retail context, where data is collected from sensors, including temperature monitoring sensors 502 that can predict the temperature at the location of products in the vicinity thereof. A single sensor can be used for supporting many products (or assets) in its vicinity to reduce the costs. Therefore, the location of the sensors and the products are monitored and the appropriate sensors are tasked with reporting readings associated with their near-by products. Localisation microservices are used to identify the proximity of sensors to the corresponding products and temperature readings are made, thereby reducing the costs and communication overheads.

However, accurate localisation of the sensors and products requires utilising processing intensive microservices, such as microservices for analysis of radio signal or image based recognition/scanning data. Therefore, when movement of sensors or products is detected local microservice instances are invoked to locate and track them by prioritising these service requests. In other circumstances, local edge resources may be used by other traceability applications, such as routine localisation in stock taking/checking or customer/staff tracking.

Additionally, if the network performance is constrained then the service requests of the traceability applications with more important roles (such as sensor or product tracking as described above) are given priority over the less important service request relating to stock checking or customer or staff tracking.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method at least partially performed by electronic circuitry, the method comprising:
   monitoring at least one of a first performance characteristic of a first network link or a second performance characteristic of a second network link, the first network link being connected to a first service instance, the second network link being connected to a second service instance, the first service instance communicating with the second service instance via a service mesh;
   making a first prediction of first network latency of transmitting a service request via the first network link and a second prediction of second network latency of transmitting the service request via the second network link;
   using the first prediction of the first network latency and the second prediction of the second network latency to select one of the first service instance or the second service instance, and route the service request to the selected one of the first service instance or the second service instance; and
   estimating a first effective capacity of the first network link based on an observed period for which the first network link is not active and a second effective capacity of the second network link based on an observed period for which the second network link is not active.

2. The method according to claim 1, wherein the first network link is from a first service proxy and wherein the service request is routed to the selected service instance from the first service proxy.

3. The method according to claim 2, wherein the first service proxy is associated with the first service instance, the second service instance or an ingress gateway which is a source of the service request.

4. The method according to claim 1, wherein
   the first performance characteristic of the first network link comprises at least one of a maximum observed capacity of the first network link, a proportion of an observed period for which the first network link is active, or latency and size of a service request transmitted via the first network link, and
   the second performance characteristic of the second network link comprises at least one of a maximum observed capacity of the second network link, a proportion of an observed period for which the second network link is active, or latency and size of a service request transmitted via the second network link.

5. The method according to claim 1, wherein making first prediction of the first network latency comprises making a prediction of transmitting the service request via the first network link to the first service instance of a service identified in the service request.

6. The method according to claim 1, wherein the first service instance is hosted on a first host interconnected by a plurality of networks comprising one or more Local Area Networks and one or more Wide Area Networks or cloud networks.

7. The method according to claim 1, wherein estimating the first effective capacity of the first network link comprises multiplying a maximum observed capacity of the first network link by a fraction of the observed period for which the first network link is not active.

8. A method at least partially performed by electronic circuitry, the method comprising:
   monitoring at least one of a first performance characteristic of a first network link or a second performance characteristic of a second network link, the first network link being connected to a first service instance, the second network link being connected to a second service instance, the first service instance communicating with the second service instance via a service mesh;
   making a first prediction of first network latency of transmitting a service request via the first network link and a second prediction of second network latency of transmitting the service request via the second network link;
   using the first prediction of the first network latency and the second prediction of the second network latency to select one of the first service instance or the second service instance, and route the service request to the selected one of the first service instance or the second service instance; and
   estimating a first effective capacity of the first network link based on an observed period for which the first network link is not active and a second effective capacity of the second network link based on an observed period for which the second network link is not active,
   wherein making the first prediction of the first network latency of transmitting the service request via the first network link comprises dividing a data size of the service request by the estimated first effective capacity of the first network link.

9. The method according to claim 1, wherein making the first prediction of the first network latency of transmitting the service request via the first network link comprises dividing a sum of a data size of the service request and a data size of an expected response to the service request by the estimated first effective capacity of the first network link.

10. The method according to claim 1, further comprising using the monitored first performance characteristic and/or the monitored second performance characteristic to generate a first routing policy for evaluating by a first service proxy to make the first prediction of the first network latency of transmitting the service request via the first network link, to generate a second routing policy for evaluating by a second service proxy to make the second prediction of the second network latency of transmitting the service request via the second network link, and to select one of the first service instance or the second service instance to route the service request to the one selected.

11. The method according to claim 1, further comprising monitoring at least one of the first performance characteristic of the first network link or the second performance characteristic of the second network link, and using the monitored first performance characteristic and/or the monitored second performance characteristic to generate a first routing policy for evaluating by a first service proxy comprised by the service mesh to make a third prediction of third network latency of transmitting another service request from the first service proxy via first network link to the first service instance, to generate a second routing policy for evaluating by a second service proxy comprised by the service mesh to make a fourth prediction of a fourth network latency of transmitting the another service request from the second service proxy via the second network link to the second service instance, and to select one of the first service instance or the second service instance to route the service request to the one selected.

12. The method according to claim 1, further comprising predicting total latency of making the service request via the first network link to the first service instance, wherein predicting the total latency comprises summing the first network latency of transmitting the service request via the first network link, the second network latency of transmitting the service request via the second network link, and a processing latency for making the service request to the first service instance that the first network link is connected to.

13. The method according to claim 12, further comprising selecting the service instance with the lowest predicted total latency of making the service request to the service instance.

14. The method according to claim 12, further comprising:
   determining whether the predicted total latency of making the service request via the first network link to the first service instance exceeds a maximum target latency;
   excluding the first network link to the first service instance with the predicted total latency which exceeds the maximum target latency; and
   selecting the first service instance with the predicted total latency which does not exceed the maximum target latency.

15. The method according to claim 14, wherein the maximum target latency is dependent upon a role of a requestor of the service request.

16. The method according to claim 1, further comprising identifying a role of a requestor of the service request;
   selecting one of the first service instance or the second service instance; and
   routing the service request to the one selected, based on the first prediction of the first network latency, the second prediction of the second network latency, and the role of the requestor.

17. A system comprising:
   receiver circuitry configured to receive monitoring results relating to a first network link connected to a first service instance in a service mesh and a second network link connected to a second service instance in the service mesh, the monitoring results being indicative of at least one of a first performance characteristic of the first network link or a second performance characteristic of the second network link, the first service instance communicating with the second service instance via the service mesh;
   control circuitry configured to generate a first routing policy for routing a service request based on predicting a first network latency of transmitting the service request via the first network link and a second network latency of transmitting the service request via the second network link; and
   estimate a first effective capacity of the first network link based on an observed period for which the first network link is not active and a second effective capacity of the second network link based on an observed period for which the second network link is not active.

18. The system according to claim 17, wherein the control circuitry is configured to evaluate to predict the first network latency of transmitting the service request via the first network link and the second network latency of transmitting the service request via the second network link, the service request being transmitted to one of the first service instance and the second service instance.

* * * * *